US008812761B2

(12) United States Patent
Heller et al.

(10) Patent No.: US 8,812,761 B2
(45) Date of Patent: Aug. 19, 2014

(54) SYSTEM AND METHOD FOR ADJUSTING POWER USAGE TO REDUCE INTERRUPT LATENCY

(75) Inventors: Daniel S. Heller, San Francisco, CA (US); Christopher G. Peak, San Jose, CA (US); Guy G. Sotomayor, San Jose, CA (US); Umesh S. Vaishampayan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 13/284,746

(22) Filed: Oct. 28, 2011

(65) Prior Publication Data
US 2013/0111092 A1 May 2, 2013

(51) Int. Cl.
*G06F 13/24* (2006.01)
(52) U.S. Cl.
USPC .............................. 710/267; 713/323; 713/502
(58) Field of Classification Search
USPC ........... 713/300, 320, 323, 502; 710/260–269
See application file for complete search history.

(56) References Cited

U.S. PATENT DOCUMENTS

| | | | | |
|---|---|---|---|---|
| 5,832,283 A * | 11/1998 | Chou et al. | ..................... | 713/300 |
| 5,926,640 A * | 7/1999 | Mason et al. | ................. | 713/320 |
| 7,197,654 B2 * | 3/2007 | Olsen | ............................ | 713/323 |
| 7,430,673 B2 * | 9/2008 | Kardach et al. | ............... | 713/300 |
| 7,792,066 B2 * | 9/2010 | Fujii et al. | ..................... | 370/311 |
| 7,886,177 B2 * | 2/2011 | Bennett et al. | ................ | 713/502 |
| 7,930,564 B2 | 4/2011 | Arai | | |
| 7,996,663 B2 | 8/2011 | Stillwell | | |
| 8,020,025 B2 * | 9/2011 | Hyatt | ............................ | 713/502 |
| 8,024,590 B2 | 9/2011 | Song | | |
| 8,112,647 B2 | 2/2012 | Branover | | |
| 8,286,011 B2 * | 10/2012 | Satsangi et al. | ............... | 713/300 |
| 8,291,247 B1 | 10/2012 | Jupin | | |
| 8,566,628 B2 | 10/2013 | Branover | | |
| 2009/0070566 A1 * | 3/2009 | Schreiner | ...................... | 712/229 |
| 2012/0191995 A1 * | 7/2012 | Naveh et al. | .................. | 713/320 |
| 2012/0238851 A1 * | 9/2012 | Kamen et al. | ................. | 600/365 |
| 2013/0073884 A1 * | 3/2013 | Ulmer et al. | .................. | 713/320 |
| 2013/0198540 A1 * | 8/2013 | Lee et al. | ...................... | 713/320 |

OTHER PUBLICATIONS

Baruah et al. Preemptively Scheduling Hard-Real-Time Sporadic Tasks on One Processor. Dec. 1990.*
Kayande et al. Priority Based Pre-emptive Task Scheduling for Android Operating System. International Journal of Computer Science and Telecommunications. vol. 2. Issue 7. Oct. 2011.*

* cited by examiner

*Primary Examiner* — Matthew D Spittle
(74) *Attorney, Agent, or Firm* — Meyertons, Hood, Kivlin, Kowert & Goetzel, P.C.

(57) ABSTRACT

A system and method are described for warming a processor from a low power state in anticipation of a time critical interrupt. For example, one embodiment of a method comprises: detecting that a time-critical interrupt will require processor resources at some point in the future; estimating a time at which the time-critical interrupt will be triggered; scheduling a timer interrupt to fire at a specified time prior to the estimated time that the time-critical interrupt will be triggered, the timer interrupt being scheduled with sufficient time to ensure that the processor is warmed to a level at which it is capable of handling the time-critical interrupt at the time that the time-critical interrupt is triggered; and responsively triggering the timer interrupt at the specified time prior to the time critical interrupt.

24 Claims, 16 Drawing Sheets

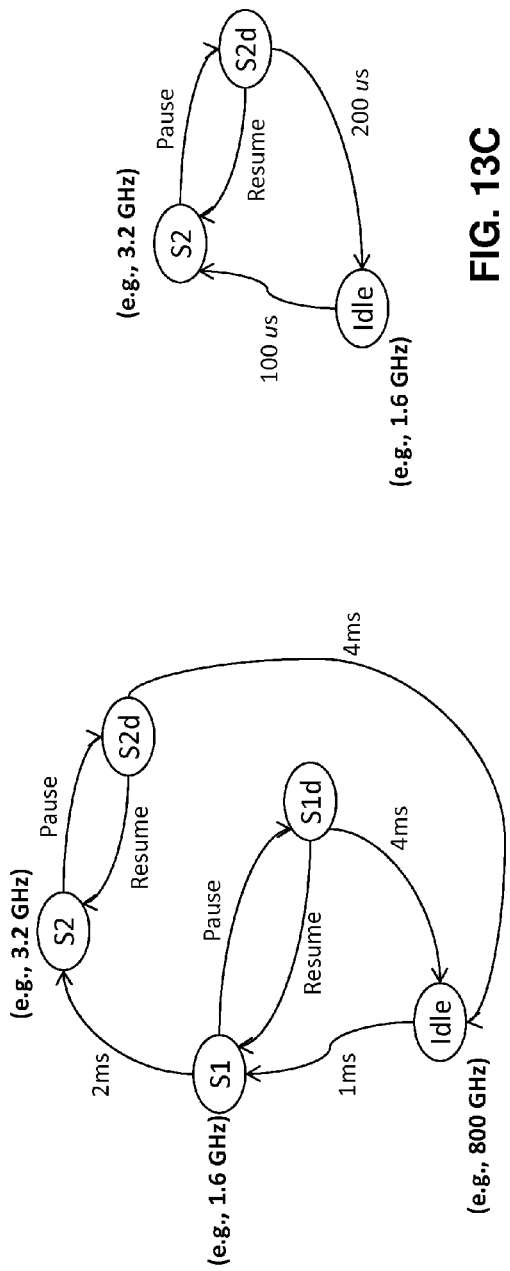
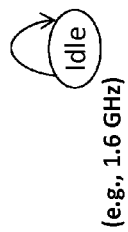
FIG. 13A
(Exemplary State Machine for "Background" Tasks)
FIG. 13B
(Exemplary State Machine for "Normal" Threads)
FIG. 13C
(Exemplary State Machine for "Real-Time" Threads)

*(Selecting Maximum Frequency/Voltage for CPU Package).*

SYSTEM AND METHOD FOR ADJUSTING POWER USAGE TO REDUCE INTERRUPT LATENCY

BACKGROUND

1. Field of the Invention

This invention relates generally to the field of computing systems. More particularly, the invention relates to an improved machine-readable medium and method for warming a CPU to reduce interrupt latency.

2. Description of Related Art

Power management on a data processing system often involves techniques for reducing the consumption of power by components in the data processing system. The data processing system may be a laptop or otherwise portable computer, such as a handheld general purpose computer, a cellular telephone, or a tablet such as iPad. The management of power consumption in a portable device which is powered by a battery is particularly important because better power management usually results in the ability to use the portable device for a longer period of time when it is powered by one or more batteries and for a given duty cycle, in smaller a physical design of the product.

Conventional systems typically utilize timers to indicate when a subsystem should be turned off after a period of inactivity. For example, the motors in a hard drive storage system are typically turned off after a predetermined period of inactivity of the hard drive system. Similarly, the backlight or other light source of a display system may be turned off in response to user inactivity which exceeds a predetermined period of time. In both cases, the power management technique is based on the use of a timer which determines when the period of inactivity exceeds a selected duration.

A typical technique for managing power consumption involves switching operation of a data processing system between different voltage and frequency pairs or "operating points." In general, a first operating point defined by voltage V1 and operating frequency F1 will consume less power than a second operating point at voltage V2 and operating frequency F2 if V1 is less than V2 and F1 is less than F2.

Certain systems provide the capability to switch power completely off (e.g. set the operating voltage at V=0) if no use is being made of a particular subsystem. For example, certain system-on-a-chip (SOC) systems provide a power gating feature which allows for particular subsystems to be turned off completely if they are not being used.

On some modern microarchitectures, a range of Central Processing Unit ("CPU") "idle" states are defined to limit energy consumption. These idle states may come with a cost. For urgent tasks (such as real-time or deadline-driven tasks), running at reduced clock speed can cause responsiveness problems or incorrectness. For example, the latency to resume execution can be many microseconds, and its magnitude and unpredictability can pose great challenges to operating systems developers. One important difficulty occurs if the system is concerned with the exact moment that an interrupt is triggered with high precision. With long latencies to exit idle states, it may not be possible to take a timestamp until long after the triggering event.

Additionally, clock speeds may not be adjusted to an optimally low level using current implementations due to "background" tasks which run indefinitely but have no speed requirements. The variety of workloads and unpredictability of CPU load over time make it very difficult to craft a frequency-management algorithm which achieves both responsiveness for high-importance tasks and low power consumption under low-priority load.

Accordingly, what is needed is a more intelligent way to both reduce power consumption and improve responsiveness for certain tasks.

SUMMARY

A system and method are described for warming a processor from a low power state in anticipation of a time critical interrupt. For example, one embodiment of a method comprises: detecting that a time-critical interrupt will require processor resources at some point in the future; estimating a time at which the time-critical interrupt will be triggered; scheduling a timer interrupt to fire at a specified time prior to the estimated time that the time-critical interrupt will be triggered, the timer interrupt being scheduled with sufficient time to ensure that the processor is warmed to a level at which it is capable of handling the time-critical interrupt at the time that the time-critical interrupt is triggered; and responsively triggering the timer interrupt at the specified time prior to the time critical interrupt.

BRIEF DESCRIPTION OF THE DRAWINGS

A better understanding of the present invention can be obtained from the following detailed description in conjunction with the following drawings, in which:

FIGS. 13A-C illustrate exemplary state machines for normal, real-time, and background tasks, respectively.

DETAILED DESCRIPTION OF PREFERRED EMBODIMENTS

Figure 1:
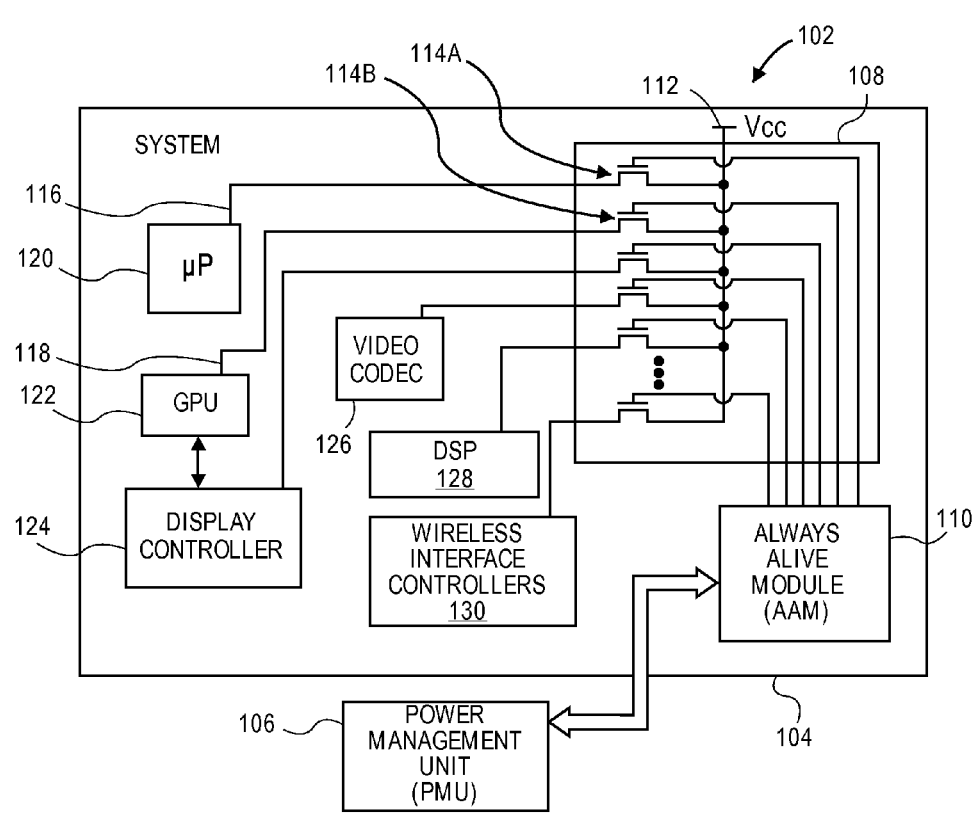
FIG. 1 shows a view of an exemplary data processing system according to at least some embodiments of the present invention.

Described below are embodiments of an apparatus, method, and machine-readable medium for incorporating task urgency information in frequency transition decisions. In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

The co-pending patent application entitled "Improved Timer Interrupt Latency," Ser. No. 13/174,688, Filed Jun. 30, 2011 (hereinafter "Co-pending Application"), which is assigned to the assignee of the present patent application describes a variety of techniques improving timer interrupt latency. These techniques will first be described below to provide an overview, followed by a detailed description of new techniques for reducing interrupt latency and managing clock speed based on task urgency.

DISCLOSURE OF THE CO-PENDING APPLICATION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Exemplary embodiments of methods, apparatuses, and systems to reduce timer interrupt latency are described herein. The cost of exiting idle states to service timer interrupts for a data processing system is overcome while still allowing aggressive use of a variety of idle states, and while allowing higher levels of software abstraction to ignore those states. Moreover, the risk of interrupts firing earlier than they are needed is minimized by restoring original deadlines on exit from an idle state.

In at least some embodiments, an indication that a subsystem (e.g., a processor) is about to enter an idle state is received, and an original fire time for a next timer interrupt is determined. The original fire time indicates when the timer that is already present in the system has been scheduled to fire. An idle state for a subsystem can be selected from a plurality of idle states. A new fire time can be determined based on the selected idle state. The next timer interrupt is rescheduled to the new fire time, as described in further detail below.

In at least some embodiments, the timers that are already present in the system and that have already been requested can be rescheduled depending upon an idle state of the system and how far the timers are along a time line from a current time, as described in further detail below.

In at least some embodiments, a subsystem exits an idle state, and a latency of the subsystem in exiting the idle state is measured at a current time. The measured latency is added to a running average of latencies for that idle state. A previous latency is recomputed based on the running average. The latency is recomputed to adjust the original fire time for a next timer interrupt, as described in further detail below.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone with a multi-touch input device.

FIG. 1 shows a view 100 of an exemplary data processing system 102 including one or more subsystems which may be used in at least some embodiments of the present invention. The system 102 includes a power management unit 106 which is coupled through a data path to an always-alive module 110 which provides control signals to a power controller 108 which includes a plurality of power gates which provide power selectively to a plurality of different subsystems within the system 104, which may be a system on a chip component. The subsystems, may be, for example, a microprocessor 120, a graphics processing unit (GPU) 122, a display controller 124, a video decoder 126, a digital signal processor (DSP) 128, and a wireless interface controllers 130.

In at least some embodiments, the one or more subsystems include a microcontroller. In at least some embodiments, the one or more subsystems include a microprocessor, such as an Intel Pentium® microprocessor, Motorola Power PC® microprocessor, Intel Core™ Duo processor, Intel Core i3, Intel Core i5, Intel Core i7, AMD Athlon™ processor, AMD Turion™ processor, AMD Sempron™ processor, and/or any other microprocessor. In one embodiment, the subsystem includes a CPU, a microcontroller, a digital signal processor, a microprocessor, a personal computer ("PC"), or any combination thereof. In one embodiment, the subsystem includes a general purpose computer system based on the PowerPC®, Intel Core™ Duo, Intel Core i3, Intel Core i5, Intel Core i7, AMD Athlon™, AMD Turion™ processor, AMD Sempron™, HP Pavilion™ PC, HP Compaq™ PC, and any other processor families.

Referring back to FIG. 1, each of the subsystems 120, 122, 124, 126, 128, and 130 are coupled to a corresponding power gate through which power is supplied to the subsystem. It will be appreciated that multiple power gates may be provided in parallel to provide additional current capacity if need for a particular subsystem. Each power gate, such as power gate 114A or 114B, has its drain electrode coupled to a power supply voltage rail 112 and its source coupled to the corresponding subsystem. The gate electrode of each power gate is coupled to a control signal provided by the always-alive module 110 which may be controlled, in at least certain embodiments, by the power management unit 106 which may be coupled to the microprocessor through one or more buses as described herein. Through this arrangement, it is possible for the microprocessor to selectively cause the various different subsystems to be turned on and off by causing the power management unit 106 to provide control signals to the always-alive module 110 which in turn provides the appropriate control signals to turn on or off one or more of the subsystems. For example, the microprocessor 120 may instruct the power management unit 106 to turn off the GPU 122 by providing a control signal to the always-alive module 110 which in turn sets a voltage on the gate electrode of the power gate 114B which in turn shuts off the voltage supply to the GPU 122 through the power line 66. Similarly, one or more of the other subsystems may also be selectively turned off by causing its supply voltage to be dropped to a value well below that necessary to operate the subsystem. The microprocessor 120 may even turn itself off by saving state and context information for the various application programs and operating system programs which are executing at the time the microprocessor decides to turn power off for itself. It will be understood that the system 102 may have additional subsystems, not shown, such as memory controllers, etc. (examples of additional subsystems are shown in FIG. 3) or the system 102 may have fewer subsystems than shown in FIG. 1. It will also be understood that the system 102 may include one or more buses and one or more bus bridges which are used to interconnect the data and control signals between the various subsystems. The bus architecture shown in FIG. 2 is an example of one or more buses being used to couple the various components of a subsystem together.

Figure 2:
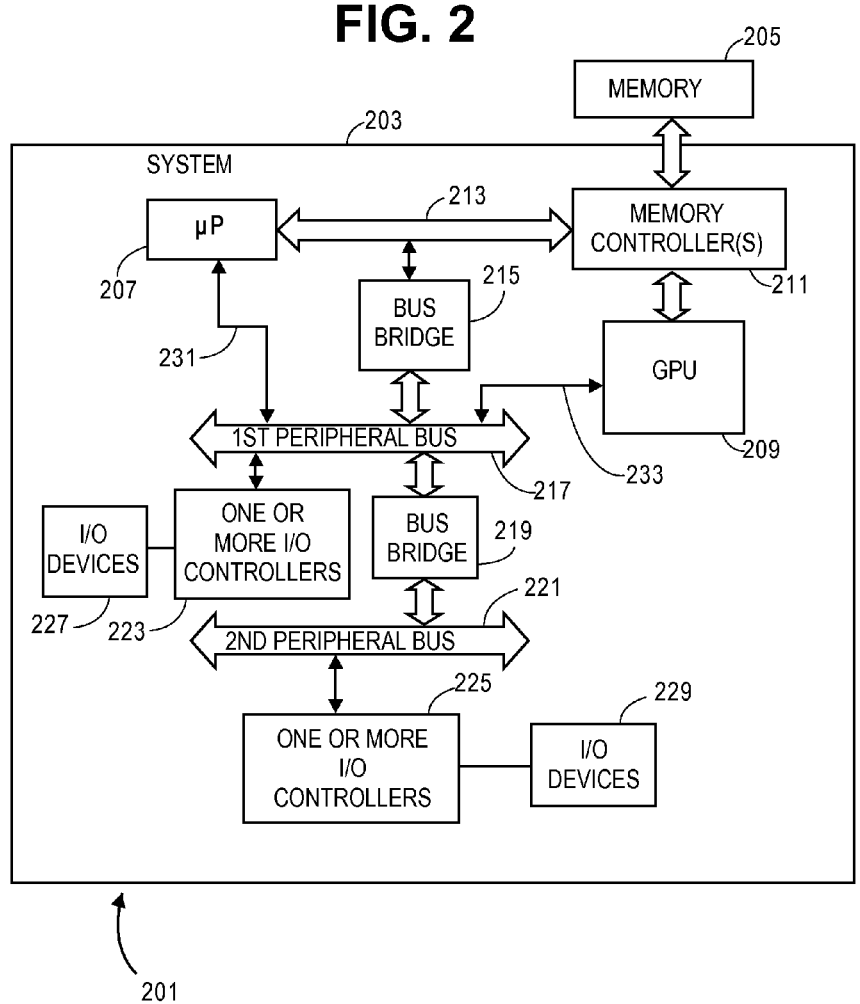
FIG. 2 shows a view of an exemplary bus architecture according to at least some embodiments of the present invention.
Figure 3:
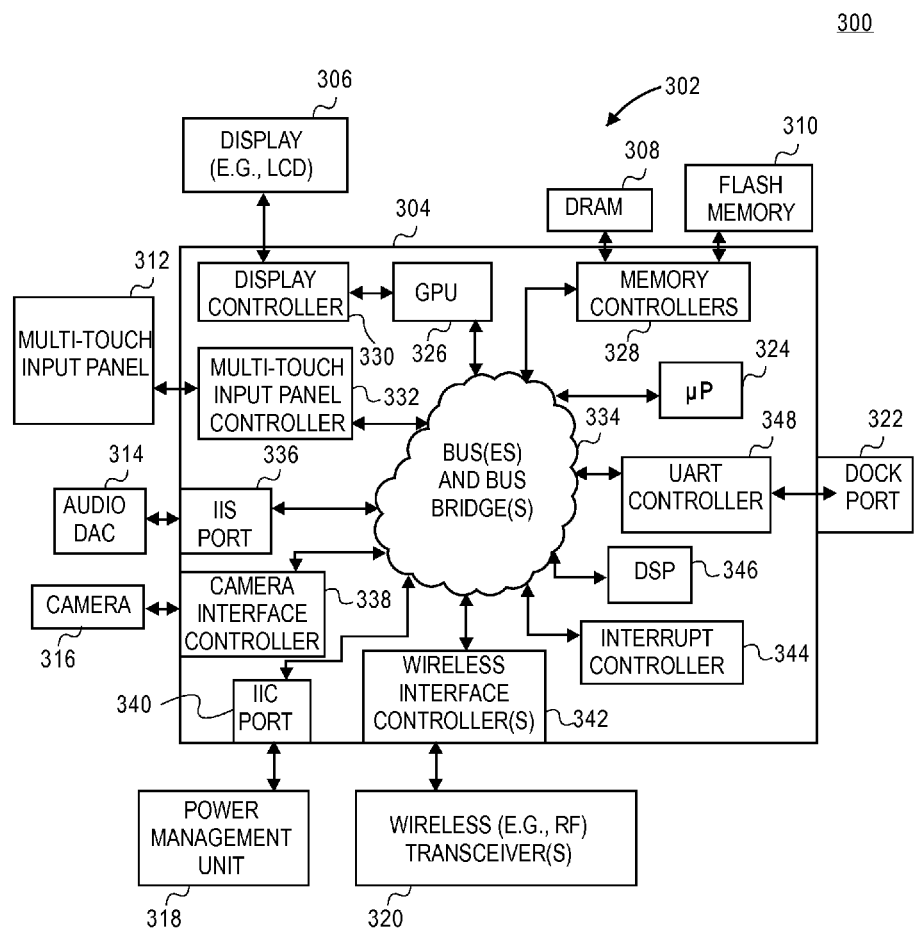
FIG. 3 shows a view of an exemplary data processing system according to at least some embodiments of the present invention.

FIG. 2 shows a view 200 of an exemplary bus architecture which may be used in at least some embodiments of the present invention. This bus architecture may be used to couple together the subsystems in the system 102 of FIG. 1 and the subsystems in the system 302 of FIG. 3. The data processing system 201 includes a memory 205 and a system 203 which may be implemented in at least one embodiment as a system on a chip, which is a monolithic semiconductor substrate which forms an integrated circuit that provides all the components for the system on a single chip. In an alternative embodiment, the various components may be spread over multiple integrated circuits. The system 203 includes a microprocessor 207 which is coupled to memory 205 through a bus 213 and a memory controller 211. The memory controller 211 may be multiple memory controllers for controlling different types of memory 205, such as DRAM (e.g. DDR RAM), and flash memory and/or other types or combinations of memory such as a magnetic hard drive, etc. The memory controller 211 is coupled to a graphics processing unit 209 which allows the GPU to obtain graphics data or store graphics data in the memory 205 and to retrieve graphics instructions, for processing by the GPU, from the memory 205. It will be understood that the GPU 209 is coupled to a display controller, such as the display controller 124 shown in FIG. 1, which in turn is coupled to a display to drive the display to cause images to appear on the display, such as a liquid crystal display (LCD). The microprocessor 207, the memory controller 211, the memory 205, and the GPU 209 are coupled to the rest of the subsystems of FIG. 2 through two peripheral buses and two bus bridges as shown in FIG. 2. Bus bridge 215 couples the bus 213 to the first peripheral bus 217, and bus bridge 219 couples the first peripheral bus 217 to the second peripheral bus 121. The microprocessor 207 and the GPU 209 are coupled to the peripheral buses 217 and 121 through these bus bridges. The GPU 209 is also coupled to the first peripheral bus 217 through a control port for graphics 233 to the first peripheral bus 217 and the microprocessor 207 is also coupled to the first peripheral bus 217 through a peripheral port 231 of the microprocessor 207. One or more input/output (I/O) devices may be part of the system 201. These I/O devices may be one or more of a plurality of known I/O devices including track pads, touch pads, multi-touch input panels, an audio speaker and an audio microphone, a camera, a dock port, one or more wireless interface controllers, a cursor control device such as a mouse or a joystick or a trackball, one or more keyboards, one or more network interface adapters (e.g. an Ethernet interface port), etc. If the system 203 is implemented as a system on a chip, then the I/O devices 227 and 229 would typically be a separate component which is not disposed on the integrated circuit. Each of the I/O devices 227 and 229 are coupled through I/O controllers, such as the I/O controllers 223 and the I/O controllers 225 as shown in FIG. 2. In addition to the I/O devices previously listed, the system 203 may include other subsystems which may be considered an I/O device, such as a video decoder or a digital signal processor such as the video decoder 126 and the DSP 128 as shown in FIG. 1. An embodiment of the system shown in FIG. 2 may include a power controller and a power management unit, along with an always-alive module in order to provide power gating to the various subsystems in the system 203. For example, a power management unit, which may be similar to the power management unit 106, may be coupled to an always-alive module, which may be similar to the always-alive module 110, which in turn is coupled to provide control signals to a power controller, such as the power controller 108, in order to turn power on and off for one or more of the subsystems in the system 203, such as one or more of the I/O controllers or one or more of the I/O devices of FIG. 2 or the GPU 209 or the microprocessor 207, etc.

FIG. 3 shows a view 300 of another exemplary data processing system which may be used in at least some embodiments of the invention. The data processing system 302 may implement the system 304 as a system on a chip (SOC) integrated circuit or may implement the system 304 as multiple integrated circuits coupled by one or more buses. The data processing system 302 includes a plurality of components which are shown external to the system 304 but which are coupled to the system 304 as shown in FIG. 3. Such components include the dynamic random access memory (DRAM) 308, the flash memory 310, both of which are coupled to the memory controllers 328, the dock port 322 which is coupled to a Universal Asynchronous Receiver Transmitter ("UART") controller 348, the wireless (RF) transceivers 320 which are coupled to the wireless interface controllers 342, the power management unit 318 which is coupled to the IIC port 340, the camera 316 which is coupled to the camera interface controller 338, the audio digital-to-analog converter 314 which is coupled to the IIS port 336, the multi-touch input panel 312 which is coupled to the multi-touch input panel controller 332, and the display device 306 which may be a liquid crystal display device, which is coupled to the display controller 330. These various components provide input and output capabilities for the data processing system as is known in the art. In addition, the system 304 includes a graphics processing unit 326 and a microprocessor 324 which may be, in certain embodiments, an ARM microprocessor. In addition, the system may include a digital signal processor 346 and an interrupt controller 344. These various components are coupled together by one or more buses and bus bridges 334 which may be implemented in a variety of architectures, such as the bus architecture shown in FIG. 2 or alternative bus architectures. The power management unit 318 may operate in the same manner as the power management unit 106 of FIG. 1, thereby providing power reduction capabilities to one or more subsystems by turning power on or off selectively for one or more subsystems as described herein. The power management unit 318 may be coupled to an always-alive module (e.g., similar to always-alive module 110) and a power controller (e.g., similar to power controller 108) in the system of FIG. 3. Further, the power management unit 318, in conjunction with the microprocessor 324, may implement other power reduction techniques, such as operating at different voltage and frequency operating points. While the power management unit is shown external to the system 304, it may be part of a system on a chip implementation in certain embodiments. At least some of the other components, such as the wireless transceivers 320, may also be implemented in certain embodiments as part of a system on a chip. The wireless transceivers 320 may include infrared transceivers as well as radio frequency (RF) transceivers and may include one or more of such transceivers, such as a wireless cellular telephone transceiver, a WiFi compliant transceiver, a WiMax compliant transceiver, a Bluetooth compliant transceiver, and other types of wireless transceivers. In one particular embodiment, the wireless transceivers 320 may include a wireless cellular telephone transceiver, a WiFi compliant transceiver (IEEE 802.11 A/G transceiver), and a Bluetooth transceiver. Each of these wireless transceivers may be coupled to a respective wireless interface controller which may be one or more of a plurality of interface controllers, such as a UART controller or an IIS controller or an SDIO controller, etc. The data processing system 302 may include further input/output devices, such as a keypad, or a keyboard, or a cursor control device, or additional output devices, etc.

It will be understood that the data processing system of FIG. 3 may be implemented in a variety of different form factors or enclosures which package and embody the data processing system. For example, the data processing system 302 may be implemented as a desktop computer, a laptop computer, or an embedded system, consumer product or a handheld computer or other handheld device. It may be implemented to operate off of AC power or a combination of AC power and battery power or merely battery power in at least certain modes. The data processing system may include a cellular telephone and may have the form factor of a cellular telephone, such as a candy-bar style cellular telephone or a flip phone or a phone with a sliding keyboard which slides out (e.g., from an enclosure) or swings out (e.g., from an enclosure) to expose the keys of the keyboard. In certain embodiments, the data processing system 302 may be implemented in a tablet format of a small handheld computer which includes wireless cellular telephony and WiFi and Bluetooth wireless capability.

Figure 4:
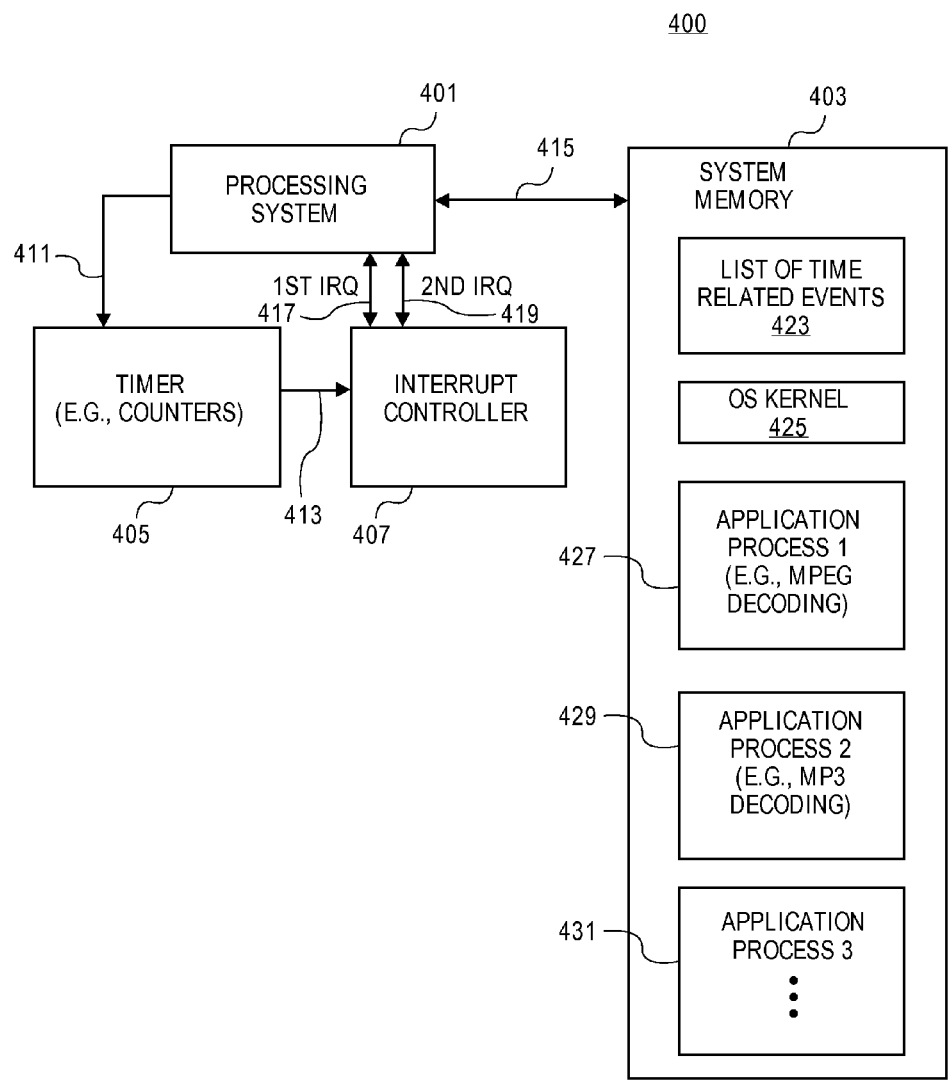
FIG. 4 shows a view of an exemplary data processing system according to at least some embodiments of the present invention.

FIG. 4 shows a view 400 of an exemplary data processing system which includes a processing system 401 coupled to a system memory 403 by a bus 415 that may be used in at least some embodiments of the present invention. As shown in FIG. 4 the system includes an interrupt controller 407 which is coupled to the processing system 401 through one or more data paths, such as data paths 417 and 419. In at least one embodiment, the processing system may be the microprocessor 324 and the system memory 403 may be one or both of memory 308 and flash memory 310, and the interrupt controller 407 may be the interrupt controller 344. The system of FIG. 4 also includes a timer 405 which includes one or more counters which are capable of asserting a timeout or other similar signal over data path 413, and these timeout assertion signals can in turn cause the interrupt controller 407 to generate an interrupt signal over one of the data paths, such as data path 417 and data path 419.

The data path 411 allows the processing system 401 to store a count value or timer value or other time-related value into the timer 405. The interrupt controller 407 may be a conventional interrupt controller that provides two different types of interrupt signals, such as a fast interrupt signal and a normal interrupt signal in the case of microprocessors from ARM Ltd. of Cambridge, England. The first interrupt signal 417 may be the fast interrupt signal which typically will provide a higher priority of service to the source of the interrupt than the other type of interrupt signal, as described in U.S. Pat. No. 7,917,784 which is hereby incorporated herein by reference. As shown in FIG. 4, memory 403 stores a plurality of different application processes, such as application process 427, application process 429, and application process 431 which may be executing on the data processing system of FIG. 4 at any one point in time. Application process 427 may be, for example, an MPEG decoding operation being performed partly in software by the processing system 401 and partly by an MPEG decoding hardware subsystem such as the subsystem 126 shown in FIG. 1. The application process 429 may, for example, be an MP3 decoding operation which is performed in part by the processing system 401 and in part by a separate hardware subsystem such as another data decoder which is dedicated to audio data, etc. Application process 431 may be another software process being performed in part by the processing system and performed in part by yet another subsystem (e.g. the DSP 346 of FIG. 3). Hence, the state of the memory 403 shows that multiple applications may be executing concurrently and multiple subsystems may be operating concurrently, with the OS kernel 425, which is an executing operating system software, overseeing the management of various tasks and processes in a conventional manner. In one exemplary embodiment, one subsystem may be the processing system itself (the microprocessor 326) and the other subsystem currently in operation may be an MPEG decoding subsystem or the GPU. In any event, at least certain embodiments of the inventions allow different processes for different subsystems to either concurrently or sequentially utilize a fast interrupt signal to respond to a time-related event in order to keep time for those subsystems. The processing system 401, in conjunction with the OS kernel 425, typically maintains a data structure, such as a list of time-related events ("timers"), such as the list 423 shown stored in the memory 403. This list may be an ordered list from almost now to a future time and the processing system may use this list to service events that were scheduled for operation in the future at the time they were scheduled, such that they may be performed at the time scheduled and requested by the particular subsystem or process. In at least some embodiments, timers in the list 423 are adjusted, as described herein. In at least some embodiments, the methods as described herein with respect to FIGS. 5-9 are performed at OS kernel 425 level.

In at least some embodiments, reducing timer interrupt latency involves (1) determining an original fire time for a next timer interrupt, (2) selecting an idle state for a subsystem; and (3) determining a new fire time based on the selected idle state. An idle state is one of reduced power states (e.g., a sleep state) of the system. The original fire time can be determined in response to the subsystem deciding to enter the idle state. Outstanding timer interrupt requests can be reprogrammed when entering a CPU idle state to compensate for the cost of exiting that state.

Generally, CPU idle states, for example, Ci-states, where i can be any integer number from 1 to N, are the states when the CPU has reduced or turned off selected functions to reduce power consumption. Different processors may support different numbers of idle states in which various parts of the CPU are turned off or operate at a reduced power. Various idle states for a processor can be characterized by different power consumption levels. For example, deeper Ci states shut off more parts of the CPU, leading to significantly reduced power consumption than shallower Ci states. Typically, C0 is an operational state at which a CPU actively executes instructions to perform certain operations. C1 may be a first idle state at which a clock running to a processor may be gated, i.e. the clock is prevented from reaching the core, effectively shutting the processor down in an operational sense. C2 may be a second idle state. At the second idle state in addition to gating the clock, an external I/O Controller Hub may block interrupts to the processor. Deeper C-states, such as C6 and C7 states have greater latencies and have higher energy entry/exit costs than shallower C-states, such as C1 or C2. The resulting performance (e.g., timing) and energy penalties become significant when the entry/exit frequency of a deeper C-state is high. Typically, there's a trade-off between power consumption and time to resume from a sleep state—the less power the system consumes, the longer it takes to the system to start running and also the slower the system may run when the system finally begins code execution.

In at least some embodiments, selecting an idle state for a subsystem involves determining exit latency data for each of the idle states of the subsystem, as described in further detail below.

In at least some embodiments, at the time when a data processing system decides to enter an idle state on a given processor, it takes a note of a next interrupt scheduled for that processor. The information about a next existing interrupt ("next original fire time") can be used to determine a choice of which idle state to enter for a given processor. In preparation for entering the idle state, the data processing system re-schedules the next timer interrupt to a new fire time based on an expected latency needed to exit the idle state, as described in further detail below.

Figure 5:
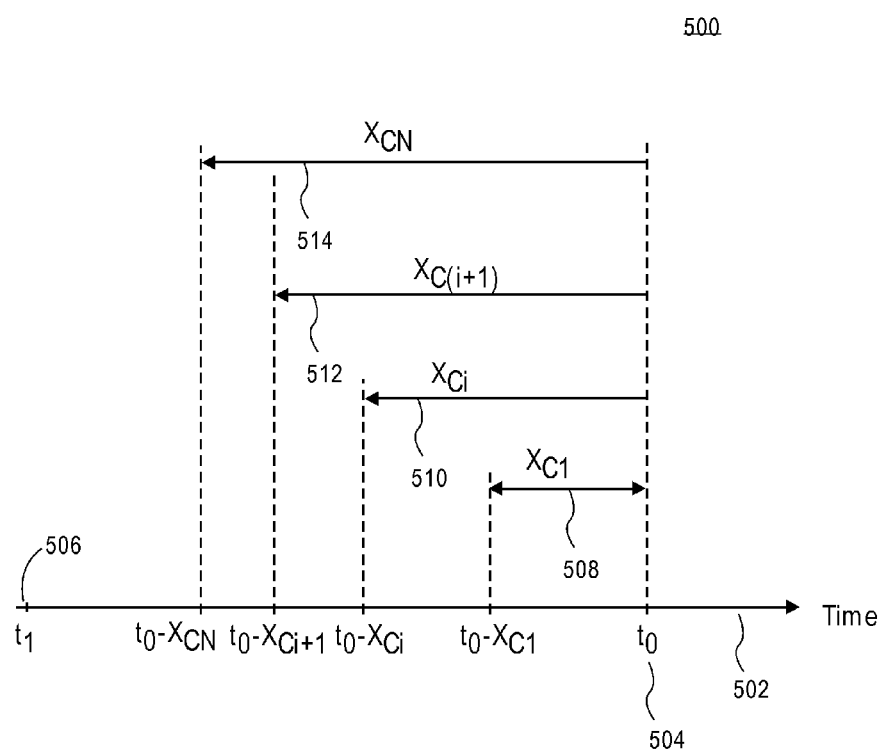
FIG. 5 shows an exemplary view of a time line to re-schedule timer interrupts according to one embodiment of the invention.

FIG. 5 shows an exemplary view 500 of a time line 502 to re-schedule timer interrupts according to one embodiment of the invention. Time line 502 includes a next existing scheduled fire time 504 that occurs sometime in the future relative to current time 506. For example, next fire time 504 may be a target deadline that has been scheduled for a processor of the data processing system to wake up and start to execute a code to service an interrupt. Current time 506 may be a time at which it is determined that a data processing system decides to enter an idle state on a given processor.

Typically, for a processor to exit an idle state and begin executing instructions a certain amount of work in the hardware needs to be done. Therefore, a certain amount of latency is paid to return to a state where the processor can execute instructions.

The variable and unpredictable latency to exit the lower power states may cause various problems for operation of the data processing system, for example for video and/or audio processing. For example, in audio processing, when multiple timers in a loop get shifted by latency add up a user may experience a noticeable delay between pressing a keyboard and hearing a sound.

In at least some embodiments, an exit latency is compensated by requesting a wake up earlier than it was originally scheduled in an amount that corresponds to the exit latency as best as it can be predicted.

FIG. 5 shows different amounts of time 508, 510, 512, and 514 (latencies) needed for a subsystem to exit different idle states. The latency to exit an idle state is variable and depends on the characteristics of an idle state. As shown in FIG. 5, shallower idle states have latencies smaller than deeper idle states. For example, C1 state has a minimum latency 508 (XC1), and CN state has a maximum latency 514(XCN), such as XC1<XCi<XCi+1<XCN.

In at least some embodiments, the next timer interrupt can be re-scheduled by subtracting from the original fire time the expected time needed to exit the idle state. So, if a processor needs to be up and executing instructions at time t0 and it is predicted that it may take X amount of time to exit the low power state, then as the system enters the low power state the processor is requested to wake up at time t0−X.

For example, if the original request fire time is t0, and the idle state is C1, then the timer is rescheduled for t0−XC1; if the idle state is Ci, the timer is rescheduled for t0−XCi; if the idle state is Ci+1, the timer is rescheduled for t0−XCi+1; and if the idle state is CN, the timer is rescheduled for t0−XCN. The original fire time t0 is adjusted by a variable value determined based on characteristics of the idle state of the subsystem. That is, the value to which to adjust the fire time is not fixed.

In at least some embodiments, selecting of the idle state is performed based at least on the original fire time. For example, a difference between the original fire time, such as t0, and a current time, such as t1 can be calculated, and an idle state, such as one of the C1-CN states can be selected based on the difference between the original fire time and the current time, such as t0−t1. In at least some embodiments, a subsystem enters the selected idle state to exit the selected idle state at the adjusted fire time to operate on an event.

Figure 6:
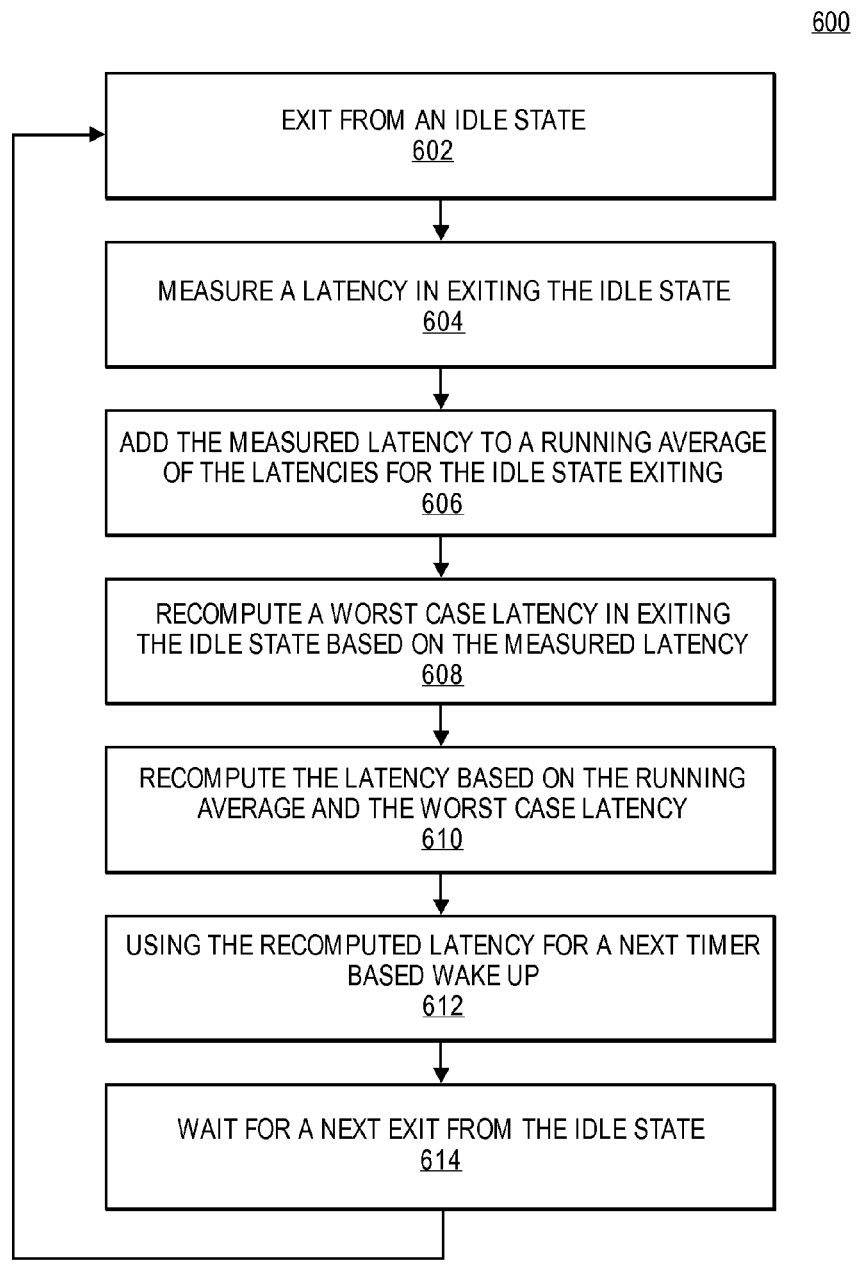
FIG. 6 shows a flowchart of one embodiment of a method to adjust original fire time.

FIG. 6 shows a flowchart of one embodiment of a method 600 to adjust original fire time. Method begins at operation 602 involving a subsystem exiting from an idle state. The idle state may be one of the reduced power states, such as any of C1-CN states, as described above. A latency in exiting the idle state (e.g., $XC_i$) is measured at operation 604.

For example, the exit latency can be determined experimentally by scheduling timers and measuring how long after the target deadline the interrupt handler is able to run. In at least some embodiments, the exit latency is measured for each of a plurality of CPUs and each of a plurality of idle states of the CPU. In at least some embodiments, measuring of the latency in exiting the idle state is done dynamically at runtime.

Method 600 continues with operation 606 involving dynamically calculating an average latency by adding the measured latency to a running average of latencies for the idle state. In at least some embodiments, a worst case latency in exiting the idle state is determined from the latencies measured over time, for example, before the current time. At operation 608 the worst case latency is recomputed based on the latency measured at a current time. At operation 610 a previous latency is recomputed for a next timer interrupt based on the running average and the recomputed worst case latency. In at least some embodiments, the latency is measured at a current time, and the previous latency is computed at a previous time before the current time.

At operation 612 the recomputed latency is used to adjust an existing (original) fire time for a next timer based wake up. That is, measuring the latency in exiting an idle state is performed dynamically at runtime, and adjusting an original fire time to a new fire time for a next timer interrupt is performed based on the runtime measurements. Method 600 continues at operation 614 involving waiting for a next exit of the subsystem from an idle state.

Figure 7:
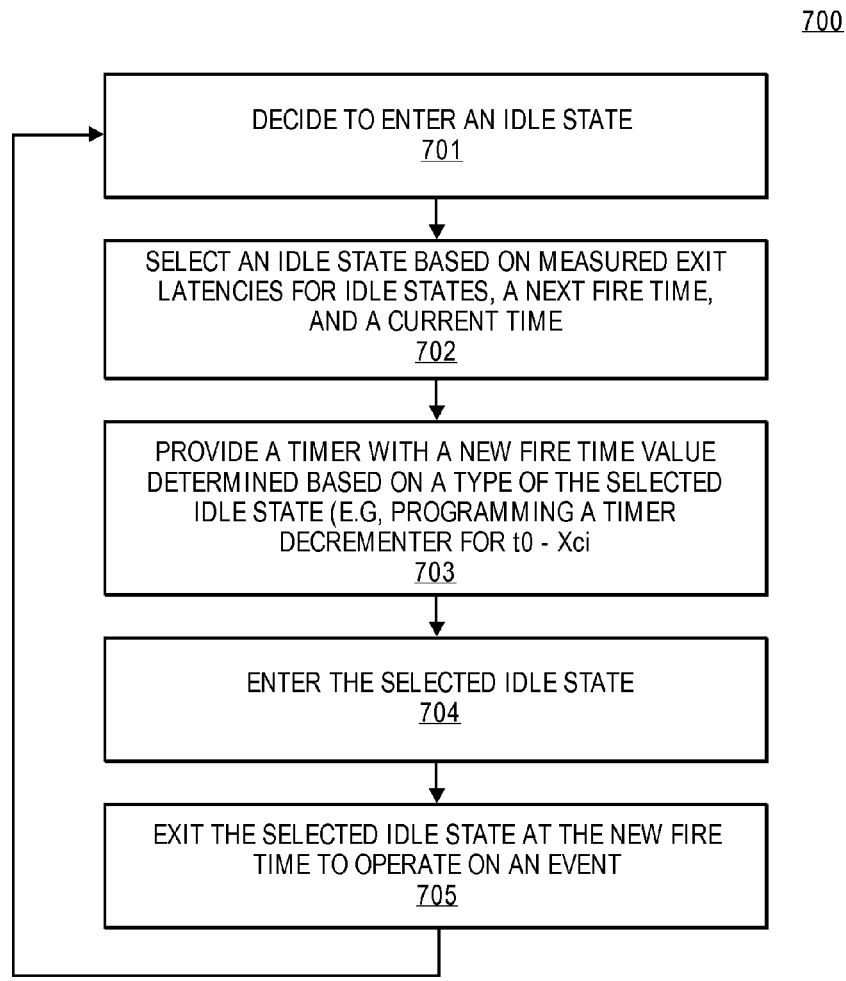
FIG. 7 shows a flowchart of one embodiment of a method to reduce timer interrupt latency.

FIG. 7 shows a flowchart of one embodiment of a method 700 to reduce timer interrupt latency. Method begins with operation 701 involving a subsystem deciding to enter an idle state. At operation 702 an idle state is selected based on exit latencies that have been measured for each of the idle states, an original fire time for a next timer interrupt, and a current time at which it is determined that the system is about to enter the idle state. The selection of the idle state can be based on the amount of measured latencies. In at least some embodiments, because the latencies in exiting from different idle states are being measured at runtime, as described above, the system dynamically selects the idle state based on a difference between current time $t_1$ and original fire time $t_0$. In at least some embodiments, the system selects a largest power saving idle state that has a exit latency less than the difference between current time $t_1$ and original fire time $t_0$. For example, if $XC_1 < t_1 - t_0$ and $XC_2 < t_1 - t_0$, but $XC_3 > t_1 - t_0$, the C2 state is selected. Selecting the idle state is described in further detail with respect to FIGS. 8 and 9.

At operation 703 a timer is provided with a new fire time value determined based on a type of the selected idle state. In at least some embodiments, a time decrementer is programmed for $t_0 - XC_i$, where $t_0$ indicates a number time units in future corresponding to an original fire time, and $XC_i$ indicates a number of time units corresponding to an exit latency for the idle state. In at least some embodiments, the time decrementer includes one or more counters which are capable of asserting a timeout or other similar signal to an interrupt controller to generate an interrupt signal to the system. At operation 704 the selected idle state is entered. Operation 705 involves exiting the selected idle state at the new fire time to operate on an event. After operating the event, the method can return back to operation 701. In at least some embodiments, a record of the original requested fire time is kept, so that if the idle period ends before the timer fires (e.g. due to hardware interrupt or inter-processor interrupt), the interrupt can again be rescheduled for its original deadline (no idle exit time need now be compensated for).

Figure 8:
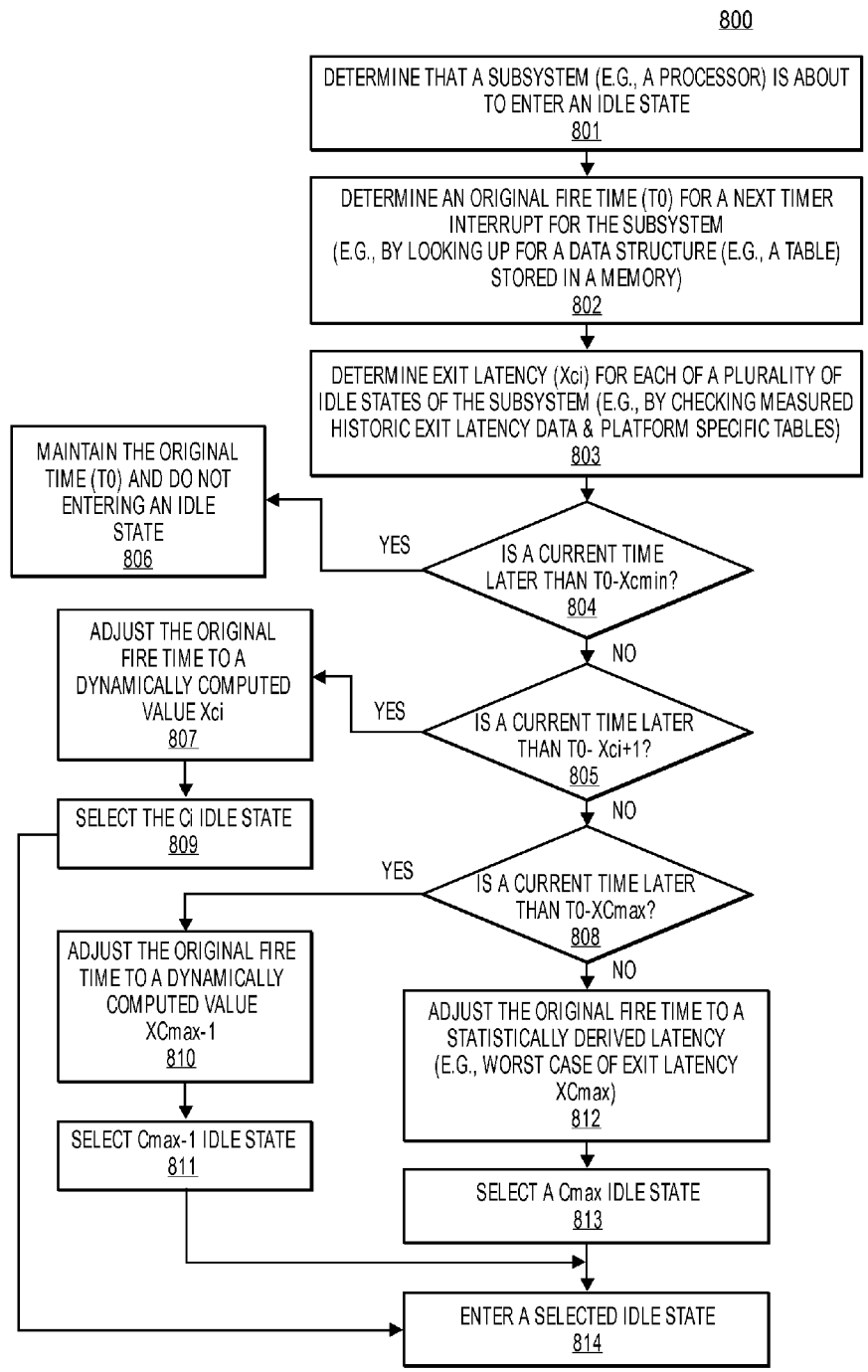
FIG. 8 shows a flowchart of one embodiment of a method to select an idle state.

FIG. 8 shows a flowchart of one embodiment of a method 800 to select an idle state. Method 800 begins with operation 801 that involves determining that a subsystem (e.g., a processor) is about to enter an idle state. At operation 802 an original fire time ($T_0$) for a next timer interrupt for the subsystem is determined. For example, the original fire time may be determined by looking up for a data structure (e.g., a table, list, or the like) stored in a memory, such as a memory 205, 308, 301, or 403. In at least some embodiments, the original fire time can be stored in a list of time related events, such as a list 423. At operation 803 exit latencies for each of a plurality of idle states of the subsystem (e.g., a processor) are determined. For example, exit latencies $XC_1$-$XC_N$ can be determined by checking measured historic exit latency data collected up to a current time and/or platform specific tables for each of processors and for each of idle states. In at least some embodiments, the exit latencies are average latencies dynamically computed based on measured latencies and a worst case latency, as described above with respect to FIG. 6.

Method 800 continues with operation 804 that determines whether or not a current time is later than a difference between the original fire time and the smallest exit latency ($t_0 - XC_{min}$). Typically, a shallowest idle state in which power consumption is greatest among all other idle states, such as a C1-state, has the smallest exit latency. If the current time is later than the difference $t_0 - XC_{min}$, the original fire time $t_0$ is maintained, and the subsystem is prevented from entering an idle state at operation 806.

If the current time is not later than the difference $t_0 - XC_{min}$, a determination is made at operation 805 whether or not the current time is later than $t_0 - XC_{i+1}$, where $XC_{i+1}$ is an exit latency from $C_{i+1}$ state, and where i is any integer from 1 to N-1, where CN indicates a deepest idle state in which the power consumption is smaller than in other idle states. If the current time is later than the difference $t_0 - XC_{i+1}$, at operation 807 the original fire time is adjusted to a dynamically computed latency value $XC_i$. In one embodiment, latency value $XC_i$ is computed dynamically at runtime, as described with respect to FIG. 6. An idle state $C_i$ is chosen at operation 809.

If the current time is not later than the difference $t_0 - XC_{i+1}$, at operation 808 a determination is made whether or not a current time is later than $t_0 - XC_{max}$. Typically, a deepest idle state in which power consumption is smallest among all other idle states, such as a CN-state, has the largest exit latency. If the current time is later than the difference $t_0 - XC_{max}$, at operation 810 the original fire time is adjusted to a dynamically computed value $XC_{max} - 1$. At operation 811 a $C_{max} - 1$ idle state is chosen.

If the current time is not later than the difference $t_0 - XC_{max}$, at operation 812 the original fire time is adjusted to a statistically derived exit latency (for example, a worst case exit latency $XC_{max}$). In at least some embodiments, the statistically derived exit latency is a worst case latency statistically derived from measured exit latencies data throughout a life time of a processor. At operation 813 a $C_{max}$ idle state is chosen. In at least some embodiments, the $C_{max}$ idle state is a deepest reduced power state in which the subsystem consumes smaller power than in any other idle state. At operation 814 an idle state chosen at operations 809, 811, or 813, is entered.

Figure 9:
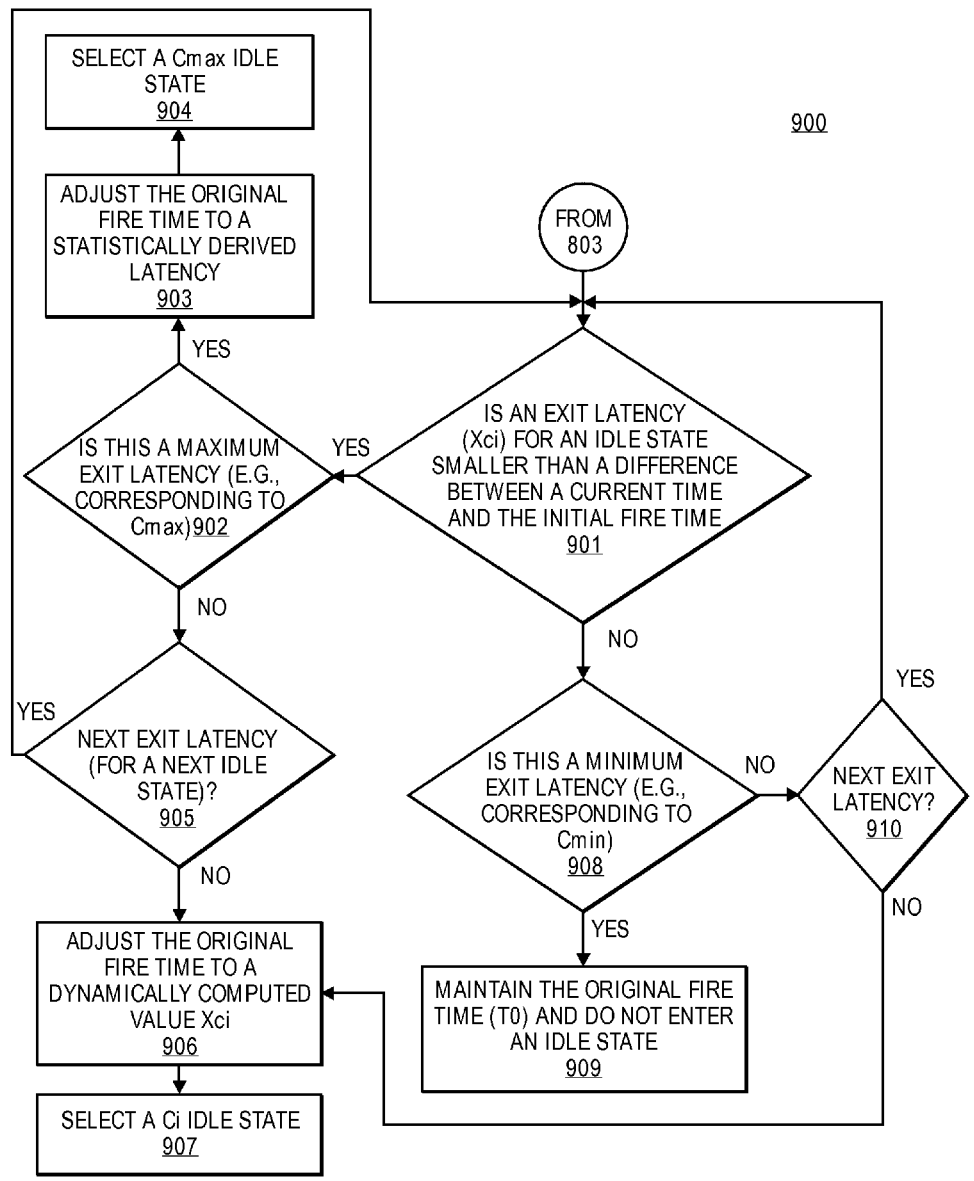
FIG. 9 shows a flowchart of another embodiment of a method to select an idle state.

FIG. 9 shows a flowchart of another embodiment of a method 900 to select an idle state. Method 900 begins with operations 801-803, as described above. Method 900 continues with operation 901 that involves determining whether or not an exit latency (XCi) for an idle state is smaller than a difference between a current time and an original fire time (t1–t0). That is, an exit latency recomputed in operation 612 can be compared with the difference between a current time and an original fire time.

If the exit latency is smaller than the difference (t–t0), at operation 902 a determination is made whether or not the exit latency XCi is a maximum exit latency. Typically, the maximum exit latency corresponds to a deepest idle state in which the system consumes the smaller amount of power than in all other idle states. If the exit latency is a maximum exit latency, at operation 903 an original fire time is adjusted to a statistically derived latency, as described above.

At operation 904 a deepest idle state (e.g., Cmax state) is chosen. If the exit latency is not a maximum latency, at operation 905 it is determined whether there is a next exit latency to consider. If there is a next exit latency, method 900 returns to operation 901. If there is no next exit latency, at operation 906 the original fire time is adjusted to a dynamically computed latency value XCi. In at least one embodiment, latency value XCi is computed dynamically at runtime, as described with respect to FIG. 6.

At operation 907 a Ci idle state is selected. If the exit latency is not smaller than the difference (t1–t0), at operation 908 a determination is made whether or not the exit latency is a minimum exit latency. Typically, the minimum exit latency corresponds to a shallowest idle state in which the system consumes greater amount of power than in all other idle states. If the exit latency is the minimum exit latency, at operation 909 the original fire time t0 is maintained, and the subsystem is prevented from entering an idle state. If the exit latency is not the minimum exit latency, at operation 910 it is determined whether there is a next exit latency to consider. If there is no exit latency to consider, method 900 goes to operation 906. If there is a next exit latency, method 900 returns to operation 901.

Embodiments of a System and Method for CPU Warming to Reduce Interrupt Latency

As discussed above, a range of CPU "idle" states may be defined on a computer system to limit energy consumption. These idle states come with a cost, however. For example, exiting an idle state in order to service interrupts or run threads can take an unpredictable length of time. The latency to resume execution can be many microseconds, and its magnitude and unpredictability can pose great challenges to operating systems developers. One important difficulty occurs if the system is concerned with the exact moment that an interrupt is triggered, with high precision. With long latencies to exit idle states, it may not be possible to take a timestamp until long after the triggering event.

Described below is a system and method which reduces latency for time-critical interrupts whose firing time can be estimated with reasonable accuracy, and does so without substantially impacting energy consumption. These embodiments allow allows aggressive use of processor idle states while ensuring that at the crucial moment that the interrupt is triggered, the relevant processor or core is "warmed" to the point where it can receive an interrupt with low latency. In the embodiments described below, processor "warming" means increasing the frequency and/or voltage to a sufficient level so that the processor is capable of handling the interrupt.

Figure 10:
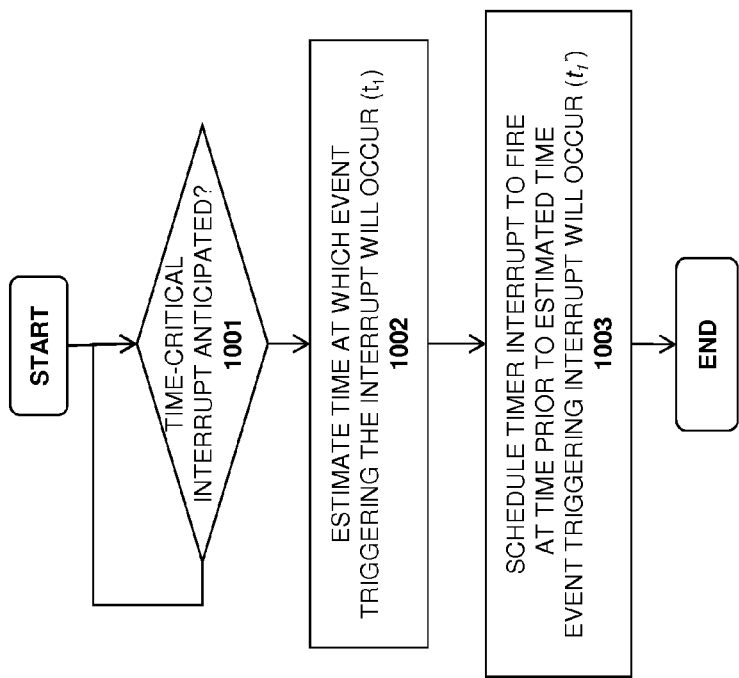
FIG. 10 illustrates one embodiment of a method for using a timer interrupt in anticipation of a system event.

FIG. 10 illustrates a method for warming a processor in anticipation of a time-critical interrupt so that the processor will be ready to handle the interrupt without significant delay. In one embodiment, the method is implemented as software executed by an operating system. It should be noted, however, that the underlying principles of the invention may be implemented in hardware, firmware, software or any combination thereof.

At 1001, a determination is made as to whether a time-critical interrupt is anticipated some time in the future. A software-generated interrupt may be identified as "time-critical," for example, by an application developer. If the interrupt is time-critical then, at 1002, the time ($t_1$) at which the event triggering the interrupt will occur is estimated. In one embodiment, this information is provided by the application program code requiring the interrupt. At 1003, a warming timer interrupt is scheduled to fire at a time ($t_1^*$) prior to the estimated time that the event triggering the interrupt will occur.

Figure 11:
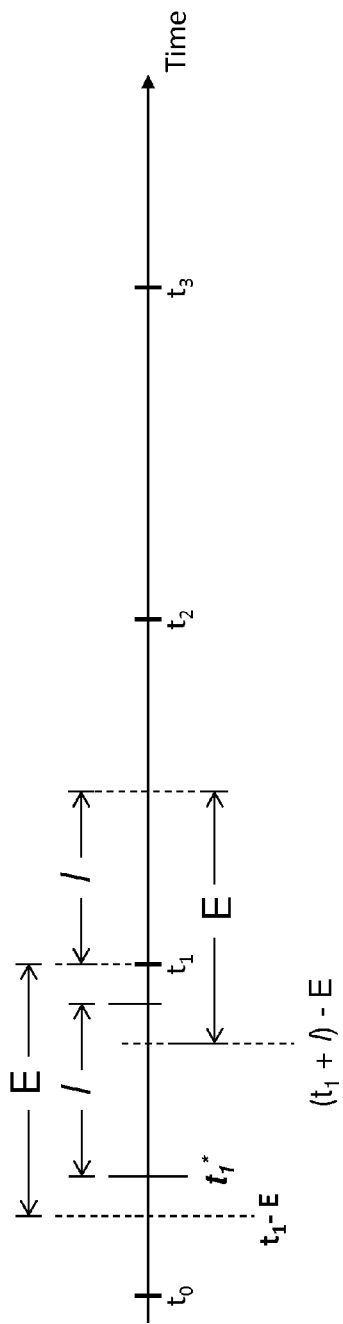
FIG. 11 illustrates a timeline showing the timing of an example timer interrupt.

As indicated in FIG. 11, in one embodiment, the timer interrupt is set according to the equation $(t_1-E) \le t_1^* \le (t_1+l)-E$ wherein E is the average exit latency of the selected idle state (i.e., the amount of time needed to fully exit the idle state); $t_1$ is the estimated fire time of the time-critical interrupt; and l is the minimum latency required to "warm" the CPU to a point at which it can handle the time-critical interrupt (i.e., the time required to achieve a minimum frequency and/or voltage level sufficient to handle the interrupt). Setting the timer interrupt ($t_1^*$) in this manner provides sufficient time for the CPU to be warmed (because $t_1^* \le (t_1+l)-E$) while at the same time ensuring that the CPU is not warmed too quickly, thereby wasting power (because $(t_1-E) \le t_1^*$)). Logically, in the above equations, l must inherently be <E (i.e., the average exit latency to fully exit the idle state must be greater than the latency to sufficiently warm the CPU so that it can handle the interrupt). In one embodiment, the value of E is continuously updated as described above and in the co-pending application, resulting in dynamically calculated values for $(t_1-E) \le t_1^* \le (t_1+l)-E$.

Embodiments of a System and Method for Incorporating Task Urgency Information in Power Management Decisions In one embodiment of the invention, task urgency information is "injected" into CPU power management decisions. In particular, in one implementation, the relative urgency characterizing one or more currently-executing threads may be exploited to determine an appropriate frequency and/or voltage for the CPU. In accordance with this embodiment, frequency/voltage decisions may still be made using an adaptive power management algorithm that is largely independent of scheduling, but the CPU may transition directly to high-speed states when critical (e.g., real time) tasks come online. In this way, both performance and real time correctness are preserved, and approximations used to identify "background" load can be made more precise. When critical tasks are distinguished from low-priority ones, it will be possible to make more aggressive use of low clock speeds without fear of harming those important tasks.

Figure 12:
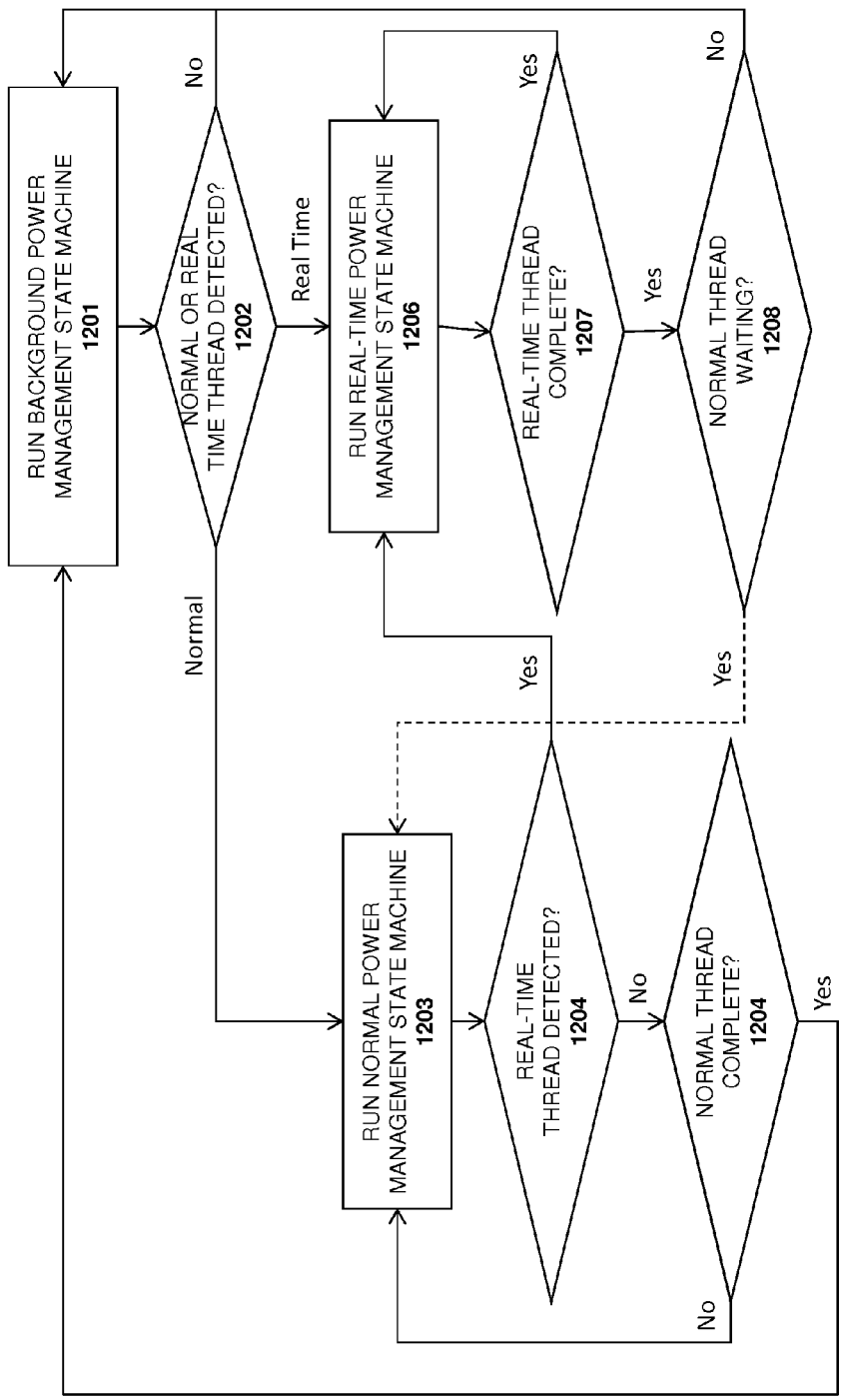
FIG. 12 illustrates a method for incorporating task urgency into clock speed transition decisions.

FIG. 12 illustrates a method in which different power management state machines are selected based on task urgency information. In this particular embodiment, three power management state machines are used: a "background" state machine for tasks having a "background" urgency, one example of which is provided in FIG. 13A; a "normal" state machine for tasks having a "normal" urgency, one example of which is provided in FIG. 13B; and a "real time" state machine for tasks having a "real time" urgency, one example of which is provided in FIG. 13C.

As set forth in FIG. 12, at 1201, the background power management state machine is initially selected. In one embodiment, the background state machine as shown in FIG. 13A, has a single idle state representing a particular idle CPU frequency and/or voltage level. By way of example, and not limitation, the idle frequency may be 1.6 GHz and the idle voltage may be any designated voltage associated with the idle state. For example, the voltage level for each of the power management states will be directly related to the semiconductor process technology employed in the CPU (e.g., 32 nanometer, 45 nanometer, etc). If no task with a normal or real time urgency is detected then the system may stay in this background idle state. If, however, a normal or real time thread is detected, determined at 1202, then the system will transition to a normal or real time state machine at 2103 or 1206, respectively. When the real-time thread is complete, determined at 1207, a determination is made as to whether the normal thread is waiting, determined at 1208. If not, then the process returns to 1201 and the background power state machine is executed. If so, then the process returns to 1203 and the normal power management state machine is executed.

FIG. 13B illustrates an exemplary state machine used for tasks/threads having a "normal" urgency level defined. As shown, this state machine causes a transition from an Idle state to the S1 power state when the task places an uninterrupted load on the processor for a period of 1 ms. By way of example, the Idle power state may represent a frequency of 800 GHz and the S1 power state may represent a frequency of 1.6 GHz as indicated. Note that the S1 power state as used herein is different from the ACPI S1 power state (in which all processor caches are flushed, and the CPU(s) stop executing instructions). In the illustrated embodiment, the "normal" state machine stays in the S1 power state until the task places an uninterrupted load on the processor for an additional period of 2 ms at which time the state machine elevates the processor's frequency and/or voltage to the S2 power state (e.g., 3.2 GHz in the illustrated example). If the task pauses when in the S1 power state or the S2 power state as shown (i.e., stops using the CPU processing resources), the state machine transitions to the S1$d$ and S2$d$ power states, respectively. While in these temporary transitional states, the processor remains at the same frequency and voltage level but starts a timer. If the task continues to pause for a total of 4 ms, then the state machine transitions back from either the S1$d$ or S2$d$ states to the Idle power state, as illustrated.

FIG. 13C illustrates an exemplary state machine used for tasks/threads having a "real-time" urgency level defined. As shown, this state machine causes a transition from an Idle state directly to the S2 power state when the task places an uninterrupted load on the processor for a period of 100 us. As mentioned above, the Idle power state may represent a frequency of 800 GHz and the S2 power state may represent a frequency of 3.2 GHz, although the underlying principles of the invention are not limited to any particular set of frequencies and/or voltages. If the task pauses when in the S2 power state as shown (i.e., stops using the CPU processing resources), the state machine transitions to the S2$d$ power state in which the processor remains at the same frequency and voltage level but starts a timer. If the task continues to pause for a total of 200 us, then the state machine transitions back to the Idle power state, as illustrated.

Figure 14:
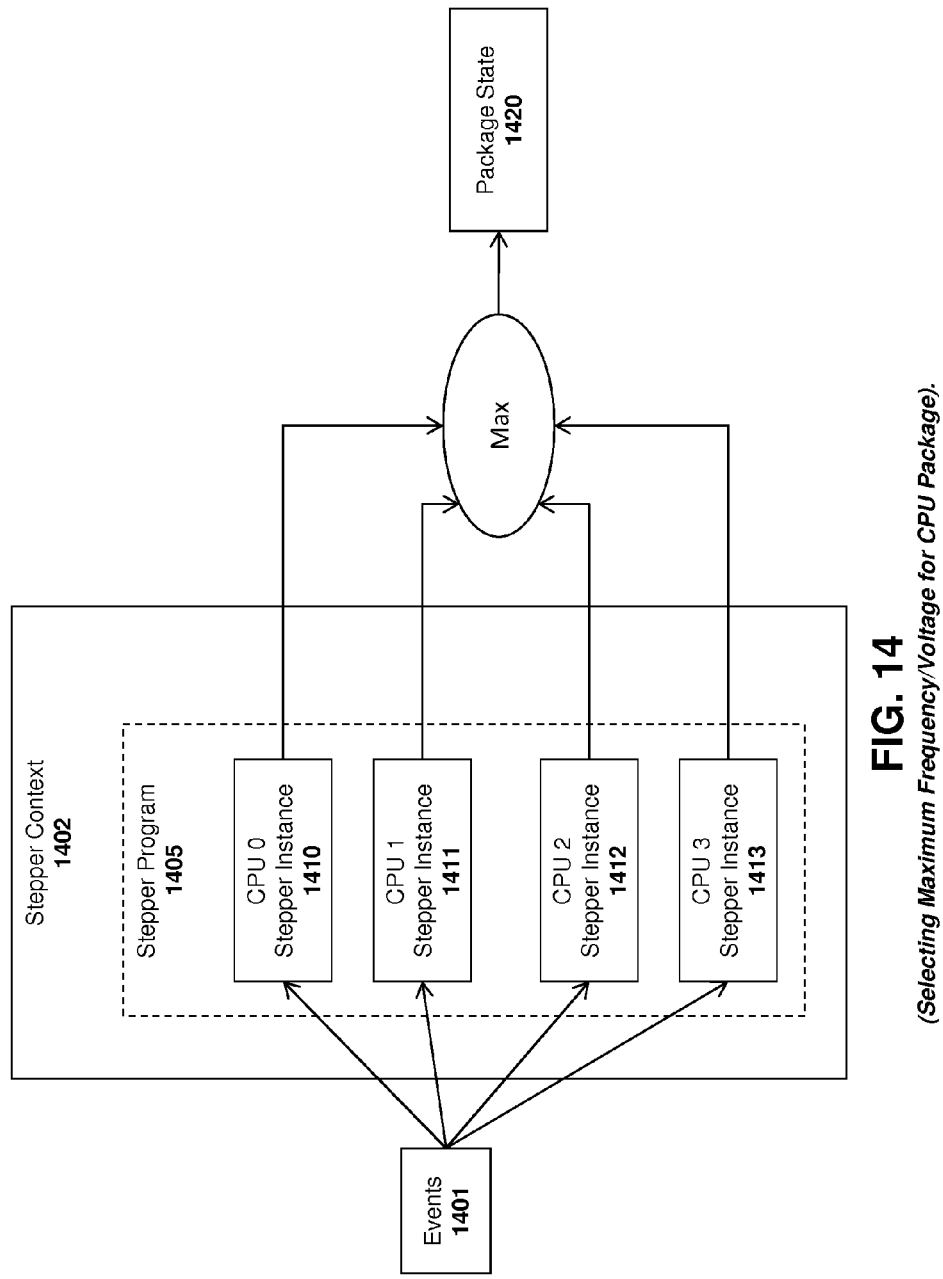
FIG. 14 illustrates an exemplary computer architecture on which embodiments of the invention may be implemented.

FIG. 14 illustrates a processor architecture for selecting a particular frequency and/or voltage to be used for each of the CPUs 1410-1413 on a processor package. In one embodiment, single stepper context 1402 maintains the state for a particular stepper program 1405. As illustrated, each CPU 1410-1413 executes its own instance of the stepper program 1405 which determines the current frequency and voltage at which the CPU operates. In one embodiment, each instance of the stepper program implements the method illustrated in FIG. 12 in combination with a set of power management state machines, some examples of which are described above with respect to FIGS. 13A-C. Each of the stepper instances respond to events 1401 which may include application program code requesting CPU processing resources (e.g., in response to the execution of one or more application programs).

Exemplary Data Processing Devices

Figure 15:
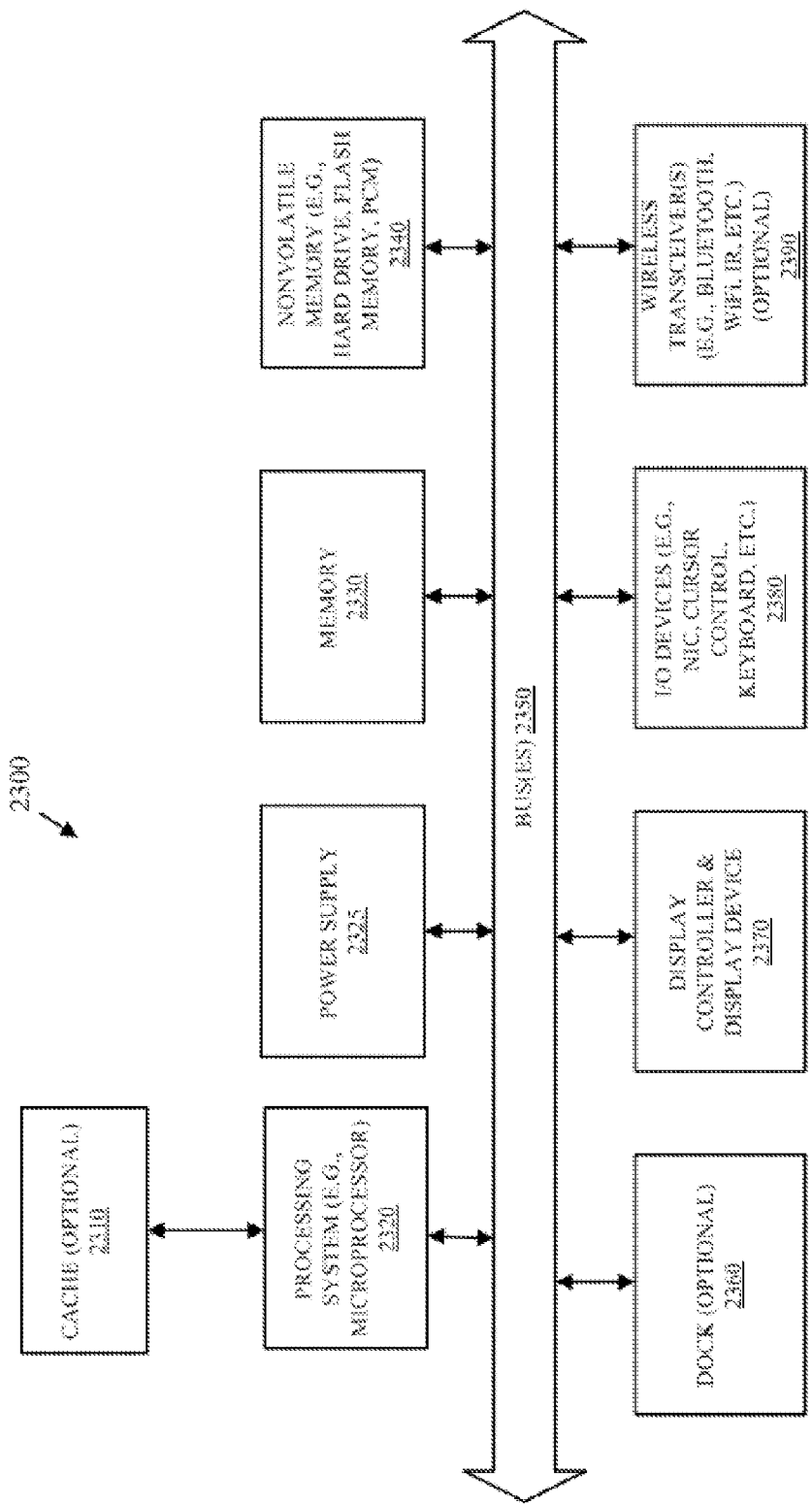
FIG. 15 illustrates another exemplary computer architecture on which embodiments of the invention may be implemented.

FIG. 15 is a block diagram illustrating an exemplary computer system which may be used in some embodiments of the invention. It should be understood that while FIG. 15 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 15, the computer system 2300, which is a form of a data processing system, includes the bus(es) 2350 which is coupled with the processing system 2320, power supply 2325, memory 2330, and the nonvolatile memory 2340 (e.g., a hard drive, flash memory, Phase-Change Memory (PCM), etc.). The bus(es) 2350 may be connected to each other through various bridges, controllers, and/or adapters as is well known in the art. The processing system 2320 may retrieve instruction(s) from the memory 2330 and/or the nonvolatile memory 2340, and execute the instructions to perform operations as described above. The bus 2350 interconnects the above components together and also interconnects those components to the optional dock 2360, the display controller & display device 2370, Input/Output devices 2380 (e.g., NIC (Network Interface Card), a cursor control (e.g., mouse, touchscreen, touchpad, etc.), a keyboard, etc.), and the optional wireless transceiver(s) 2390 (e.g., Bluetooth, WiFi, Infrared, etc.).

Figure 16:
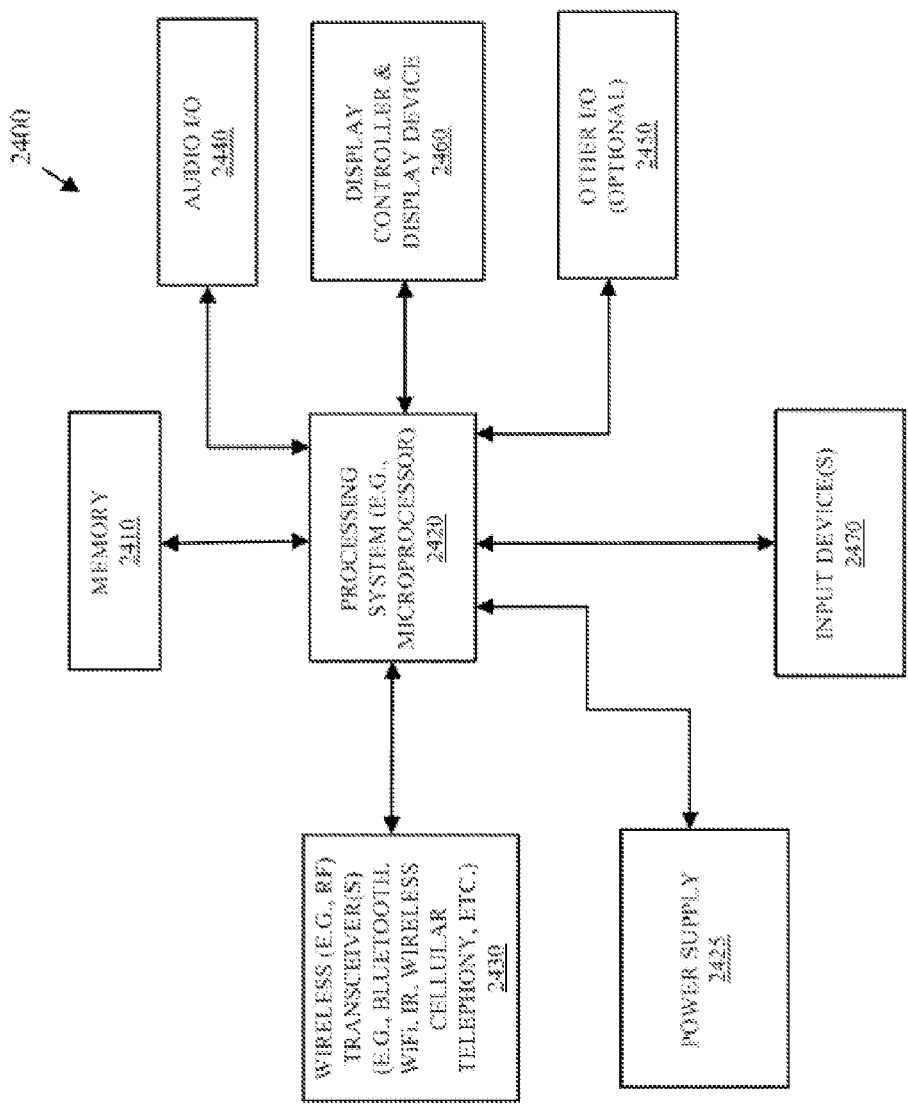

FIG. 16 is a block diagram illustrating an exemplary data processing system which may be used in some embodiments of the invention. For example, the data processing system 2400 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 2400 may be a network computer or an embedded processing device within another device.

According to one embodiment of the invention, the exemplary architecture of the data processing system 2400 may used for the mobile devices described above. The data processing system 2400 includes the processing system 2420, which may include one or more microprocessors and/or a system on an integrated circuit. The processing system 2420 is coupled with a memory 2410, a power supply 2425 (which includes one or more batteries) an audio input/output 2440, a display controller and display device 2460, optional input/output 2450, input device(s) 2470, and wireless transceiver(s) 2430. It will be appreciated that additional components, not shown in FIG. 24, may also be a part of the data processing system 2400 in certain embodiments of the invention, and in certain embodiments of the invention fewer components than shown in FIG. 16 may be used. In addition, it will be appreciated that one or more buses, not shown in FIG. 16, may be used to interconnect the various components as is well known in the art.

The memory 2410 may store data and/or programs for execution by the data processing system 2400. The audio input/output 2440 may include a microphone and/or a speaker to, for example, play music and/or provide telephony functionality through the speaker and microphone. The display controller and display device 2460 may include a graphical user interface (GUI). The wireless (e.g., RF) transceivers 2430 (e.g., a WiFi transceiver, an infrared transceiver, a Bluetooth transceiver, a wireless cellular telephony transceiver, etc.) may be used to communicate with other data processing systems. The one or more input devices 2470 allow a user to provide input to the system. These input devices may be a keypad, keyboard, touch panel, multi touch panel, etc. The optional other input/output 2450 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although embodiments of the invention are described herein within the context of a mobile computing environment (i.e., using mobile devices 120-123; 601-603), the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A method for warming a processor from a low power state in anticipation of a time critical interrupt comprising:
   detecting that a time-critical interrupt will require processor resources at some point in the future;
   estimating a time at which the time-critical interrupt will be triggered;
   scheduling a timer interrupt to fire at a specified time prior to the estimated time that the time-critical interrupt will be triggered, the timer interrupt being scheduled with sufficient time to ensure that the processor is warmed to a level at which it is capable of handling the time-critical interrupt at the time that the time-critical interrupt is triggered; and
   responsively triggering the timer interrupt at the specified time prior to the time critical interrupt.

2. The method as in claim 1 wherein the specified time at which the timer interrupt fires, $t_1^*$, is set according to the equation $(t_1-E) \leq t_1^* \leq (t_1+l)-E$ where E is the exit latency of the processor state in which the processor will be operating when the timer interrupt is fired, t1 is the time at which the time-critical interrupt will be triggered and l is the latency required to warm the processor to the level at which it is capable of handling the time-critical interrupt.

3. The method as in claim 2 wherein the exit latency is the time required for the processor to fully exit the processor state in which the processor will be operating when the timer interrupt is fired.

4. The method as in claim 1 wherein warming the processor to the level at which it is capable of handling the time-critical interrupt comprises raising a frequency and/or voltage of the processor such that the processor is capable of handling the time-critical interrupt.

5. The method as in claim 1 wherein determining that a time-critical interrupt will require processor resources comprises receiving an indication of the time-critical interrupt via an application programming interface of an operating system executed on the processor.

6. The method as in claim 1 wherein estimating a time that the time critical interrupt will be triggered comprises receiving an indication of the time from application program code requiring the time-critical interrupt.

7. The method as in claim 1 wherein the timer interrupt is scheduled based on a known period of time required to warm the processor to a level required to service the time-critical interrupt.

8. The method as in claim 1 further comprising:
   selecting a current power state for the processor based on the time at which the time-critical interrupt will be triggered and a known period of time required to warm the processor to a level required to service the time-critical interrupt from the current power state.

9. An apparatus for warming a processor from a low power state in anticipation of a time critical interrupt comprising, the apparatus comprising a non-transitory memory medium for storing program code and a processor for processing the program code to perform the operations of:
   detecting that a time-critical interrupt will require processor resources at some point in the future;
   estimating a time at which the time-critical interrupt will be triggered;
   scheduling a timer interrupt to fire at a specified time prior to the estimated time that the time-critical interrupt will be triggered, the timer interrupt being scheduled with sufficient time to ensure that the processor is warmed to a level at which it is capable of handling the time-critical interrupt at the time that the time-critical interrupt is triggered; and
   responsively triggering the timer interrupt at the specified time prior to the time critical interrupt.

10. The apparatus as in claim 9 wherein the specified time at which the timer interrupt fires, $t_1^*$, is set according to the equation $(t_1-E) \leq t_1^* \leq (t_1+l)-E$ where E is the exit latency of the processor state in which the processor will be operating when the timer interrupt is fired, t1 is the time at which the time-critical interrupt will be triggered and l is the latency required to warm the processor to the level at which it is capable of handling the time-critical interrupt.

11. The apparatus as in claim 10 wherein the exit latency is the time required for the processor to fully exit the processor state in which the processor will be operating when the timer interrupt is fired.

12. The apparatus as in claim 9 wherein warming the processor to the level at which it is capable of handling the time-critical interrupt comprises raising a frequency and/or voltage of the processor such that the processor is capable of handling the time-critical interrupt.

13. The apparatus as in claim 9 wherein determining that a time-critical interrupt will require processor resources comprises receiving an indication of the time-critical interrupt via an application programming interface of an operating system executed on the processor.

14. The apparatus as in claim 9 wherein estimating a time that the time critical interrupt will be triggered comprises receiving an indication of the time from application program code requiring the time-critical interrupt.

15. The apparatus as in claim 9 wherein the timer interrupt is scheduled based on a known period of time required to warm the processor to a level required to service the time-critical interrupt.

16. The apparatus as in claim 9 comprising additional program code to cause the processor to perform the additional operations of:
  selecting a current power state for the processor based on the time at which the time-critical interrupt will be triggered and a known period of time required to warm the processor to a level required to service the time-critical interrupt from the current power state.

17. A non-transitory machine-readable medium having program code stored thereon which, when executed by a processor, causes the processor to perform the operations of:
  detecting that a time-critical interrupt will require processor resources at some point in the future;
  estimating a time at which the time-critical interrupt will be triggered;
  means for scheduling a timer interrupt to fire at a specified time prior to the estimated time that the time-critical interrupt will be triggered, the timer interrupt being scheduled with sufficient time to ensure that the processor is warmed to a level at which it is capable of handling the time-critical interrupt at the time that the time-critical interrupt is triggered; and
  responsively triggering the timer interrupt at the specified time prior to the time critical interrupt.

18. The non-transitory machine-readable medium as in claim 17 wherein the specified time at which the timer interrupt fires, $t_1^*$, is set according to the equation $(t_1-E) \le t_1^* \le (t_1+l)-E$ where E is the exit latency of the processor state in which the processor will be operating when the timer interrupt is fired, t1 is the time at which the time-critical interrupt will be triggered and l is the latency required to warm the processor to the level at which it is capable of handling the time-critical interrupt.

19. The non-transitory machine-readable medium as in claim 18 wherein the exit latency is the time required for the processor to fully exit the processor state in which the processor will be operating when the timer interrupt is fired.

20. The non-transitory machine-readable medium as in claim 17 wherein warming the processor to the level at which it is capable of handling the time-critical interrupt comprises raising a frequency and/or voltage of the processor such that the processor is capable of handling the time-critical interrupt.

21. The non-transitory machine-readable medium as in claim 17 wherein determining that a time-critical interrupt will require processor resources comprises receiving an indication of the time-critical interrupt via an application programming interface of an operating system executed on the processor.

22. The non-transitory machine-readable medium as in claim 17 wherein estimating a time that the time critical interrupt will be triggered comprises receiving an indication of the time from application program code requiring the time-critical interrupt.

23. The non-transitory machine-readable medium as in claim 17 wherein the timer interrupt is scheduled based on a known period of time required to warm the processor to a level required to service the time-critical interrupt.

24. The non-transitory machine-readable medium as in claim 17 comprising additional program code to cause the processor to perform the additional operations of:
  selecting a current power state for the processor based on the time at which the time-critical interrupt will be triggered and a known period of time required to warm the processor to a level required to service the time-critical interrupt from the current power state.

* * * * *